(12) United States Patent
Kobayashi et al.

(10) Patent No.: US 8,349,522 B2
(45) Date of Patent: Jan. 8, 2013

(54) FUEL CELL (75) Inventors: Ayano Kobayashi, Nagoya (JP);
Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/534,076

(22) Filed: Jun. 27, 2012

(65) Prior Publication Data

US 2012/0264035 A1   Oct. 18, 2012

Related U.S. Application Data

(63) Continuation of application No. PCT/JP2011/050721, filed on Jan. 18, 2011.

(30) Foreign Application Priority Data

Jan. 27, 2010   (JP) .................................. 2010-015716

(51) Int. Cl.
  *H01M 4/36* (2006.01)
  *H01M 8/10* (2006.01)
  *H01M 2/14* (2006.01)

(52) U.S. Cl. ........................ 429/529; 429/482; 429/509

(58) Field of Classification Search .......... 429/479–482, 429/507–509, 529
See application file for complete search history.

(56) References Cited

FOREIGN PATENT DOCUMENTS

| JP | 2003-288912 A1 | 10/2003 |
| JP | 2005-310737 A1 | 11/2005 |
| JP | 2007-026975 A1 | 2/2007 |
| JP | 2007-087747 A1 | 4/2007 |
| JP | 2007-141492 A1 | 6/2007 |
| JP | 2007-200693 A1 | 8/2007 |

OTHER PUBLICATIONS

International Search Report dated Mar. 29, 2011 (with English translation).

*Primary Examiner* — Ula C. Ruddock
*Assistant Examiner* — Thomas H. Parsons
(74) *Attorney, Agent, or Firm* — Burr & Brown (57) ABSTRACT

A fuel cell (1) includes an anode (11), a cathode (14), an electrolyte layer (13) containing ceria and provided between the anode (11) and the cathode (14), and at least two intermediate layers containing zirconia and provided between the electrolyte layer (13) and the anode (11). The at least two intermediate layers include a first intermediate layer (18) that contains ceria and a second intermediate layer (19) that has a higher zirconia concentration than the first intermediate layer and is provided between the first intermediate layer and the anode.

6 Claims, 7 Drawing Sheets

FUEL CELL

TECHNICAL FIELD

The present invention relates to a fuel cell, and more particularly relates to a solid oxide fuel cell.

BACKGROUND ART

In recent years, fuel cell stack have attracted attention due to efficient use of energy resources and environmental problems.

Patent Literature 1 discloses a fuel cell stack that includes a solid electrolyte layer, an anode, and a cathode which disposed opposite to the anode with the solid electrolyte layer in-between as a reference. The solid electrolyte layer of this fuel cell employs a material formed by a solid solution of a rare earth metal in cerium oxide.

CITATION LIST

Patent Literature

[Patent Literature 1] Japanese Patent Application Laid-Open No. 2007-141492 (paragraph [0020] etc.)

SUMMARY OF INVENTION

Technical Problem

However, a fuel cell using a ceria (i.e., cerium oxide) as electrolyte has problems that high-temperature operation is difficult, and durability is not sufficient. As a result, there is a need of improvement for practical use in the performance characteristics of the fuel cell using a ceria as electrolyte.

The object of the present invention is to provide a fuel cell in which the performance characteristics can be enhanced enough for practical use.

Solution to Problem

A fuel cell according to a first aspect of the present invention includes an anode, a cathode, an electrolyte layer (in other words, a solid electrolyte layer) containing ceria and provided between the anode and the cathode, and at least two intermediate layers containing zirconia and provided between the electrolyte layer and the anode. The at least two intermediate layers include a first intermediate layer that contains ceria and a second intermediate layer that has a higher zirconia concentration than the first intermediate layer and is provided between the first intermediate layer and the anode.

Advantageous Effects of Invention

The present invention enhances the upper limit for a use temperature of a fuel cell.

BRIEF DESCRIPTION OF DRAWINGS

FIG. 4($a$) is an electron micrograph illustrating a sectional surface of a cell sample, FIG. 4 ($b$) is a zirconium (Zr) element map for the test sample, and FIG. 4 ($c$) is a cerium (Ce element map of the test sample.

FIG. 5($a$) is an electron micrograph illustrating a sectional surface of the same cell sample as FIG. 4($a$), FIG. 5 ($b$) is a zirconium concentration (Zr conc.) profile for the test sample, and FIG. 5 ($c$) is a cerium concentration (Ce conc.) profile of the test sample.

DESCRIPTION OF EMBODIMENTS

A solid oxide fuel cell (SOFC) is an example of a fuel cell. The following description makes particular reference to an SOFC that has a cell stack structure in which a plurality of fuel cells are stacked.

1. Fuel Cell Stack 1-1 Flat-Tubular Type Fuel Cell Stack

Figure 1:
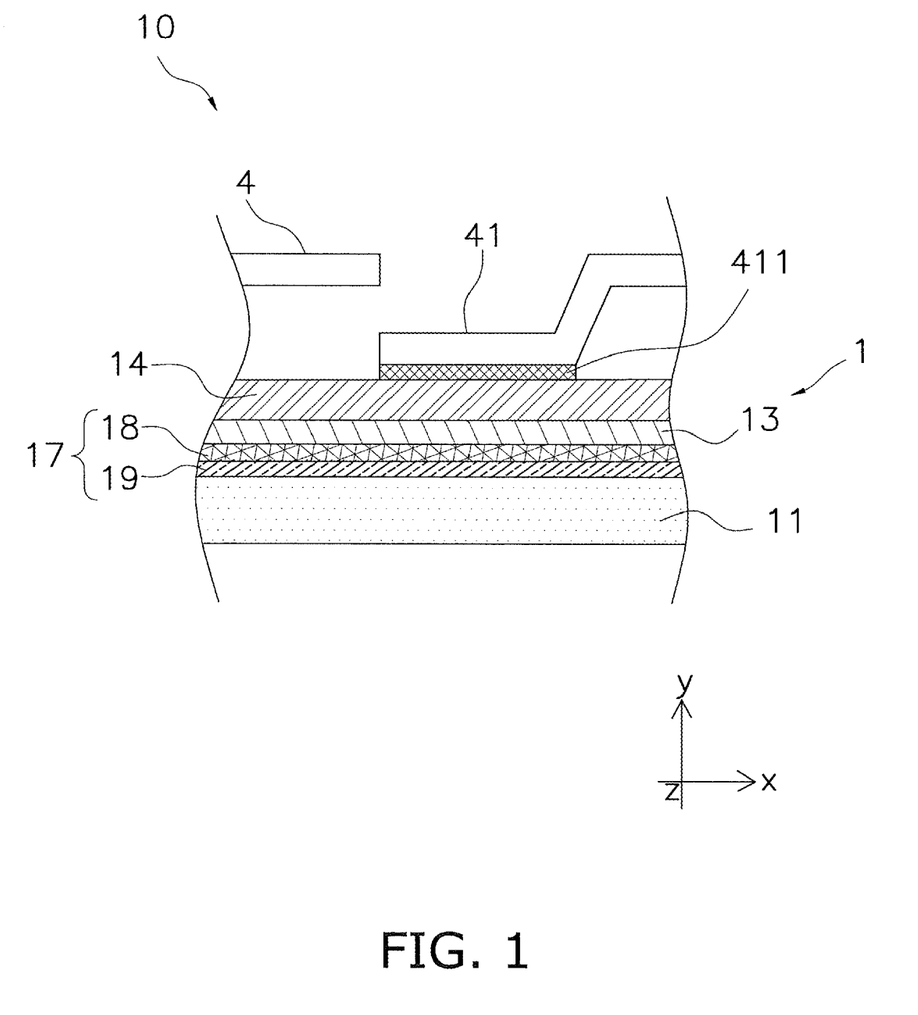
FIG. 1 is a sectional view of the principal configuration features of a fuel cell stack.

As illustrated in FIG. 1, a fuel cell stack 10 includes a fuel cell 1 (simply referred to as "cell") and an interconnector 4.

The cell 1 is configured as a thin ceramic plate having a thickness of 30 μm to 5000 μm and a diameter of 5 mm to 50 mm. The cell 1 as illustrated in FIG. 1 includes an anode 11, an electrolyte layer 13, a cathode 14 and an intermediate layer 17.

The anode 11 is configured, for example, from NiO—YSZ (nickel oxide-yttria-stabilized zirconia) or NiO—$Y_2O_3$. The anode 11 functions as an anode in addition to functioning as a base plate (may also be termed a support body) for supporting other layers included in the cell 1. That is, the thickness of the anode 11 is greater than the thickness of the electrolyte layer 13. More specifically, the thickness of the anode 11 is of the order of 0.5-5 mm. The anode 11 acquires electrical conductivity by undergoing a reduction process (for example, a process of reducing NiO to Ni).

The anode 11 may have a bilayer structure. In this configuration, the anode 11 includes a base plate and an anode active layer (fuel-side electrode) formed thereon. The material used in the base plate and the anode may be selected from the material for the anode 11 described above. For example, a combination is possible in which the base plate is configured from NiO—$Y_2O_3$ and the anode active layer is configured from NiO—YSZ.

The electrolyte layer 13 is termed a solid electrolyte layer. The electrolyte layer 13 is provided between a cathode 14 and the anode 11. The electrolyte layer 13 includes ceria. More specifically, the electrolyte layer 13 is configured from a ceria-based material including ceria and electrolyte layer 13 and rare earth metals in solid solution in ceria. More specifically, the ceria-based material may be exemplified by GDC (gadolinium-doped ceria) or SDC (samarium-doped ceria). The mol composition ratio of $Gd_2O_3:CeO_2$ in the electrolyte layer 13 is preferably 5:95-20:80.

The thickness of the electrolyte layer 13 is less than or equal to 20 μm.

The cathode 14, for example, is configured from LSCF (lanthanum strontium cobalt ferrite). More specifically, the thickness of the cathode 14 is 5 μm-50 μm.

The intermediate layer 17 is provided between the electrolyte layer 13 and the anode 11. The intermediate layer 17 includes zirconia ($ZrO_2$). The intermediate layer 17 includes two or more layers. In particular, in the present embodiment, the intermediate layer 17 includes a first intermediate layer 18 that is in contact with the electrolyte layer 13 and a second intermediate layer 19 that is in contact with the first intermediate layer 18 and the anode 11.

The intermediate layer 17 may further include a stabilizing agent such as $Y_2O_3$, $Sc_2O_3$, or the like. The mol composition ratio of the stabilizing agent:zirconia is of the order of 3:97-20:80. In other words, the intermediate layer 17 contains an yttria-stabilized zirconia such as 3YSZ, 8YSZ or a zirconia-based material such as ScSZ (scandia-stabilized zirconia), or the like.

The thickness of the intermediate layer 17 is preferably greater than or equal to 2.5 μm. Furthermore, the thickness of the intermediate layer 17 is preferably less than or equal to 10 μm. When the thickness of the intermediate layer 17 is greater than or equal to 2.5 μm, the intermediate layer exhibits superior function as an electron barrier layer, and the effect of enhancing the upper limit of the use temperature of the fuel cell is increased. When the thickness of the intermediate layer 17 is less than or equal to 10 μm, occurrence of peeling of the electrolyte layer from the anode is effectively inhibited.

The intermediate layer 17 is co-fired with the electrolyte layer 13.

The first intermediate layer 18 includes the zirconia-based material described above and ceria. The ceria and zirconia are mixed, and the first intermediate layer 18 is preferably a solid solution of ceria and zirconia. When the maximum value of the ceria concentration in the electrolyte layer 13 has a value of 1, the interface between the electrolyte layer 13 and the first intermediate layer 18 is specified as a position at which the ceria concentration is 0.5. Although there is no particular limitation on the units for "concentration" in the discussion regarding the ratio of the cerium concentration and the zirconium concentration, the term "concentration" in particular expresses a value obtained by line analysis using an atomic concentration profile, that is to say, by comparison with specific X-ray intensity using an electron probe micro analyzer (EPMA). Quantification analysis using an EPMA is well known to a person skilled in the art. An EPMA is an apparatus that uses the specific X-ray spectrum emitted as a result of irradiation of an object with an electron beam to thereby detect and identify the constituent elements in a microscopic region (approximately 1 μm³) that is irradiated by the electron beam and analyze the ratio of each constituent element. Quantification analysis using an EPMA is expressed by comparison of the specific X-ray intensity of a reference sample having a clear element concentration with the specific X-ray intensity of an unknown sample. In other words, the concentration distribution data for each element is obtained by line analysis in the thickness direction (y direction) using an EPMA in a sectional surface that is substantially parallel to the thickness direction (y axis direction) of a cell 1. When the position of the interface between the electrolyte layer 13 and the first intermediate layer 18 is determined, the distribution of the cerium concentration in the thickness direction is acquired by line analysis. The position of the line having a cerium concentration of 50% of the maximum value of the cerium concentration in the electrolyte layer 13 is specified as the position of the interface between the electrolyte layer 13 and the first intermediate layer 18.

In the present specification, EPMA may be a concept that includes energy dispersive X-ray spectroscopy (EDS).

When the average value of the cerium concentration for the electrolyte layer 13 is taken as 1, it is preferred that the cerium concentration in the in the first intermediate layer 18 is 0.1-0.4.

The thickness of the first intermediate layer 18 is preferably 0.5-2.0 μm.

The zirconium concentration in the second intermediate layer 19 is higher than that of the first intermediate layer 18.

When the maximum value of the zirconium concentration in the second intermediate layer 19 (that is to say, the maximum value of the zirconium concentration in the intermediate layer 17) has a value of 1, the position of the interface between the first intermediate layer 18 and the second intermediate layer 19 is specified as a position at which the zirconium concentration is 0.8. That is to say, the line that has a zirconium concentration that is 80% of the maximum zirconium concentration in the second intermediate layer 19 in the results of the line analysis of the intermediate layer 17 is specified as the position of the interface between the first intermediate layer 18 and the second intermediate layer 19.

When the average value of the zirconium concentration for the second intermediate layer 19 is taken as 1, it is preferred that the zirconium concentration in the first intermediate layer 18 is 0.3-0.7. The cerium concentration in the second intermediate layer 19 is preferably lower than the cerium concentration in the first intermediate layer 18. When the average value of the cerium concentration for the electrolyte layer 13 is taken as 1, it is preferred that the cerium concentration in the second intermediate layer 19 is less than or equal to 0.1, and for example, may be 0.01-0.1.

In other words, the zirconium concentration in each line contained in the first intermediate layer 18 in the distribution of the zirconium concentration in the thickness direction (y axis direction) obtained by line analysis is 30-70% of the average value of the zirconium concentration in the concentration distribution of the second intermediate layer 19.

The thickness of the second intermediate layer 19 is preferably 0.5-10 μm.

Conventionally, the use temperature of a fuel cell in which ceria functions as an electrolyte is limited for example to less than or equal to 600 degrees C. due to the following reason. When ceria is exposed to a reducing atmosphere at a high temperature (at least 700 degrees C.), the cerium ions $Ce^{4+}$ in the ceria are reduced to $Ce^{3+}$. The ceria exhibits electronic conductivity as a result of the reduction, and consequently, the electromotive force of the fuel cell is reduced.

In this respect, the cell 1 includes an intermediate layer 17 provided between the anode 11 and the electrolyte layer 13 and therefore mitigates the reduction in the electromotive force. As a result, the upper limit for the use temperature of the fuel cell is enhanced. This is thought to result from the function of the intermediate layer 17 as an electron barrier layer that inhibits reduction of the cerium in the electrolyte layer 13. In particular, the second intermediate layer 19 of the intermediate layer 17 is thought to function as the electron barrier layer.

The intermediate layer 17 can inhibit the peeling of the electrolyte layer 13 from the anode 11. As a result, the production of cracking in the electrolyte layer 13 is inhibited. In particular, the first intermediate layer 18 of the intermediate layer 17 is thought to participate in the inhibition of crack formation.

1-2 Other Aspects

The cell may include an anode, a cathode and an electrolyte layer that contains ceria provided between the anode and the cathode, and an intermediate layer containing a zirconia-based material provided between the electrolyte layer and the anode. The presence or absence of other constituent elements, and the shape, material and dimensions of the other constituent elements may be varied.

For example, the fuel cell 1 may include further and other layers.

Furthermore, the intermediate layer 17 may be configured from three or more layers. In this configuration, all intermediate layers contain zirconia. The layer that is most proximate to the electrolyte layer 13 may contain ceria.

The fuel cell stack 10 as described above includes a plurality of stacked cells 1 and an interconnector 4 that is electrically connected between the cells 1. In other words, the fuel cell stack 10 is a flat-tubular type fuel cell stack.

However, the present invention may also be applied to a segmented-in-series fuel cell stack. A segmented-in-series fuel cell stack will be described below.

Figure 6:
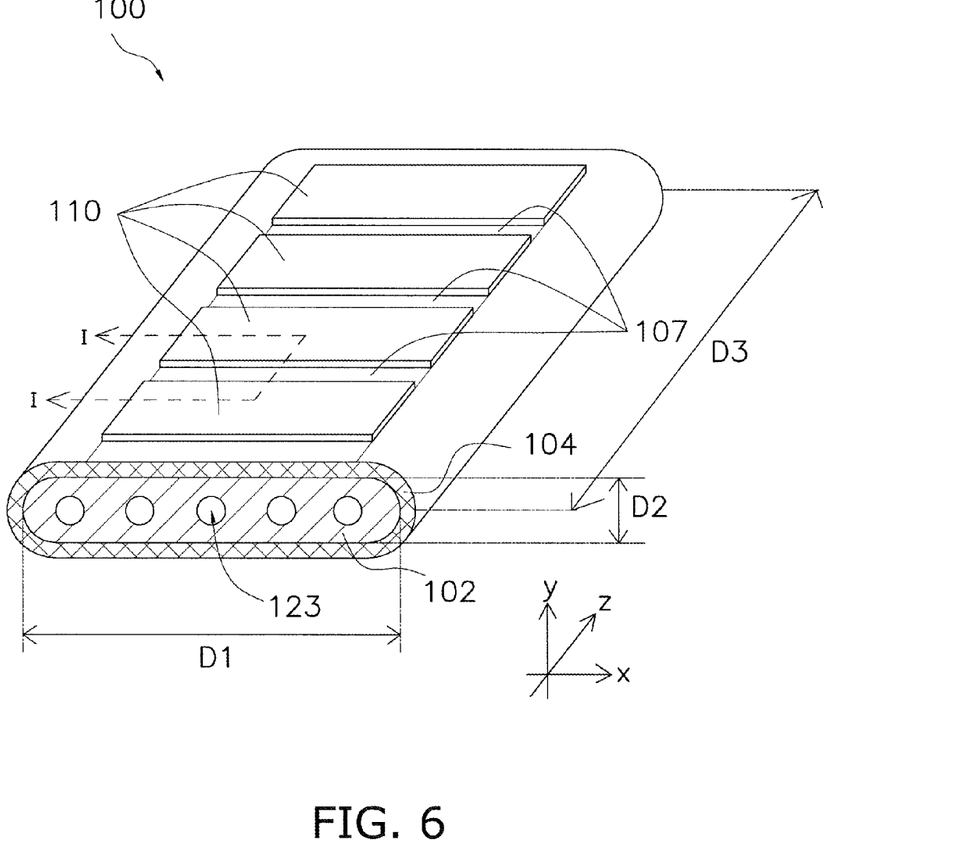
FIG. 6 is a perspective view illustrating the external appearance of a segmented-in-series fuel cell stack.

The segmented-in-series fuel cell stack (hereinafter simply referred to as "fuel cell stack") 100 includes a support base plate 102, an anode 103, an electrolyte layer 104, a barrier layer 105, a cathode 106, an interconnector 107, a collector portion 108, and an intermediate layer 130. Furthermore, the fuel cell stack 100 includes a cell 110. In FIG. 6, the collector portion 108 is not illustrated for the sake of convenience of description.

Figure 7:
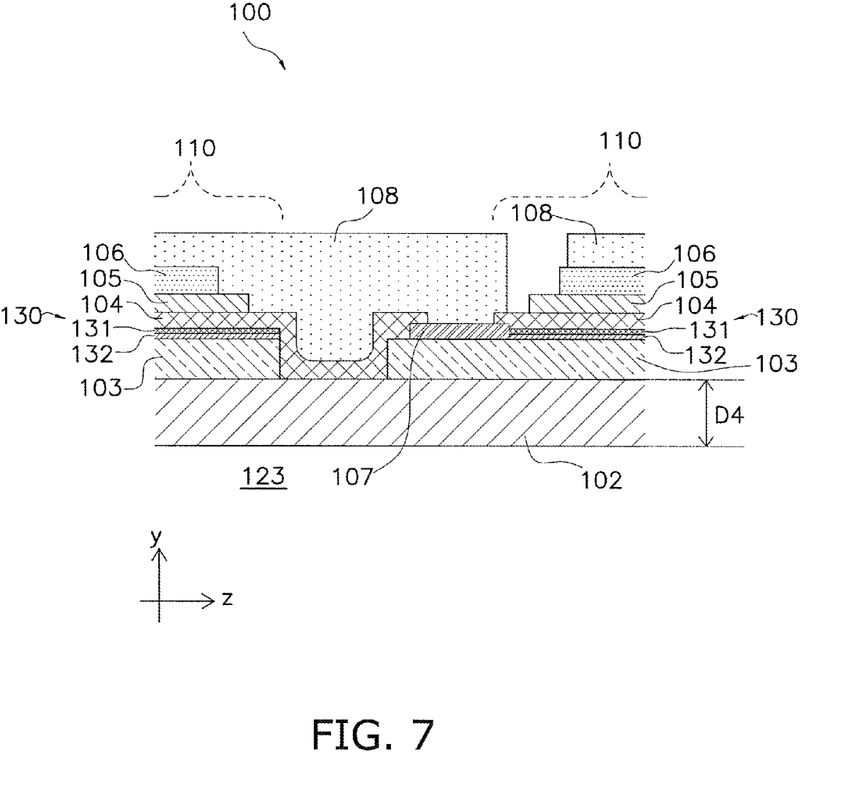
FIG. 7 is a sectional view along I-I of the segmented-in-series fuel cell stack illustrated in FIG. 6.

The fuel cell stack 100 includes a plurality of cells 110 disposed on the support base plate 102, and an interconnector 7 that electrically connects the cells 110. The cell 110 is a portion that includes an anode 103 and a cathode 106 that corresponds to the anode 103. More specifically, the cell 110 includes an anode 103, an electrolyte layer 104 and a cathode 106 that are stacked in the thickness direction (y axis direction) of the support base plate 102. In the present embodiment, although the cell 110 further includes a barrier layer 105, the present invention is not limited to this configuration.

The support base plate 102 is flat and has elongated configuration in one direction (z axis direction). The support base plate 102 is a porous body having insulating characteristics. The support base plate 102 may include nickel. The support base plate 102 more specifically may include Ni—$Y_2O_3$ (nickel-yttria) as a main constituent. The nickel may be included as an oxide (NiO). During power generation, NiO may be reduced to Ni by hydrogen gas.

As illustrated in FIG. 6 and FIG. 7, a passage 123 is provided in an inner portion of the support base plate 102. The passage 123 extends along the longitudinal direction (z axis direction) of the support base plate 102. During power generation, fuel gas flows in the passage 123, and the fuel gas is supplied to the anode 103 described below through a hole provided in the support base plate 102.

The anode 103 is provided on the support base plate 102. A plurality of anodes 103 is disposed in alignment with the longitudinal direction (z axis direction) of the support base plate 102 on a single support base plate 102. That is to say, a space is provided between adjacent anodes 103 in the longitudinal direction (z axis direction) of the support base plate 102.

The same composition as the anode 11 may be applied to the composition of the anode 103.

The anode 103 may include an anode collector layer and an anode active layer. The anode collector layer is provided on the support base plate 102, and the anode active layer is provided not to overlap with the interconnector 107 on the anode collector layer.

The anode 103 may include an anode collector layer and an anode active layer. The anode collector layer is provided on the support base plate 102, and the anode active layer is provided on the anode collector layer. The composition of the anode collector layer and the anode active layer is as described above.

The electrolyte layer 104 may also be termed a solid electrolyte layer. As illustrated in FIG. 7, the electrolyte layer 104 is provided on the anode 103. In a region without provision of the anode 103 on the support base plate 102, the electrolyte layer 104 may be provided on the support base plate 102.

The electrolyte layer 104 includes a position that is not connected in the longitudinal direction (z axis direction) of the support base plate 102. That is to say, a plurality of electrolyte layers 104 is disposed with an interval in the z axis direction. Electrolyte layers 104 that are adjacent in the z axis direction are connected by the interconnector 107. In other words, the electrolyte layer 104 is provided in connection from an interconnector 107 to an interconnector 107 that is adjacent with the interconnector 107 in the longitudinal direction (z axis direction) of the support base plate 102. The interconnector 107 and the electrolyte layer 104 have a dense structure when compared with the support base plate 102 and the anode 103. In this manner, the interconnector 107 and the electrolyte layer 104 in the fuel cell stack 100 function as a sealing unit that separates the air from the fuel gas by creating a structure which is connected with reference to the z axis direction.

The same composition as the electrolyte layer 13 may be applied to the composition of the electrolyte layer 104.

The barrier layer 105 is provided on the electrolyte layer 104. In FIG. 7, the barrier layer 105 is not provided at a position at which the electrolyte layer 104 is not provided. In other words, one barrier layer 105 is provided corresponding to one anode 103. Therefore, on one support base plate 102, a plurality of electrolyte layers 104 is provided along the longitudinal direction (z axis direction) of the support base plate 102.

The barrier layer 105 may include a principal constituent component of ceria (cerium oxide). More specifically, the material used in the barrier layer 105 may be a ceria-based material that includes ceria and rare earth metal oxide in the form of a solid solution in ceria. More specifically, the ceria-based material includes GDC ((Ce, Gd)$O_2$: gadolinium-doped ceria) and SDC ((Ce, Sm)$O_2$: samarium-doped ceria).

The cathode 106 is disposed to not exceed the outer edge of the barrier layer 105 on the barrier layer 105. One cathode 106 is stacked on one anode 103. That is to say, on one support base plate 102, a plurality of cathodes 106 is provided along the longitudinal direction (z axis direction) of the support base plate 102.

The same composition as the cathode 14 may be applied to the composition of the cathode 106.

The interconnector 107 as described above may be disposed in electrical connection between the cells 110. In FIG. 7, the interconnector 107 is stacked on the anode 103. The interconnector 107 may be connected directly onto the anode 103. The intermediate layer described below may be disposed between the anode 103 and the interconnector 107.

In the present specification, the term "stacked" includes the configuration in which two elements are disposed in connection and the configuration in which although there is no connection, the elements are superimposed in the y axis direction.

In FIG. 7, as described above, the interconnector 107 is disposed to connect the electrolyte layers 104 in the longitudinal direction (z axis direction) of the support base plate 102. In this manner, adjacent cells 110 in the longitudinal direction (z axis direction) of the support base plate 102 are electrically connected.

The interconnector 107 is a dense layer when compared with the support base plate 102 and the anode 103. The interconnector 107 includes a perovskite composite oxide as a principal constituent component, and in particular, includes a chromite-based material as a perovskite composite oxide.

The collector unit 108 is disposed to electrically connect the interconnector 107 and the cell 110. More specifically, the collector unit 108 is disposed to form a connection from the cathode 106 to the interconnector 107 that includes the cell 110 that is adjacent to the cell 110 that includes that cathode 106. The collector unit 108 may include electrically conductive properties, and for example may be configured from the same material as the interconnector 107.

The intermediate layer 130 is disposed between the anode 103 and the electrolyte layer 104. The intermediate layer 130 includes the same structure and composition as the intermediate layer 17. In other words, the intermediate layer 130 includes a first intermediate layer 131 having the same composition as the first intermediate layer 18 and a second intermediate layer 132 having the same composition as the second intermediate layer 19. Since the thickness of the first intermediate layer 131 and the second intermediate layer 132 is the same as the description in relation to the first intermediate layer 18 and the second intermediate layer 19, such description will not be repeated.

The cathode 106 included in the cell 110 is electrically connected with the adjacent cell 110 and the anode 103 by the collector unit 108 and the interconnector 107. That is to say, in addition to the interconnector 107, the collector unit 108 also participates in the connection between the cells 110, and this configuration is included in the configuration to the effect of "the interconnector electrically connects the cells".

More specifically, the dimensions of each portion in the fuel cell stack 100 may be set as described below.

| | |
|---|---|
| Width D1 of support base plate 102: | 1-10 cm |
| Thickness D2 of support base plate 102: | 1-10 mm |
| Length D3 of support base plate 102: | 5-50 cm |
| Distance D4 from outer surface of support base plate (interface between support base plate 102 and anode) to passage 123 | 0.1-4 mm |
| Thickness of anode 103 | 50-500 μm |

(When the anode 103 includes a fuel electrode collector layer and an anode active layer:

| | |
|---|---|
| Thickness of anode collector layer | 50-500 μm |
| Thickness of anode active layer | 5-30 μm) |
| Thickness of electrolyte layer 104 | 3-50 μm |
| Thickness of barrier layer 105 | 3-50 μm |
| Thickness of cathode 106 | 10-100 μm |
| Thickness of interconnector 107 | 10-100 μm |
| Thickness of collector unit 108 | 50-500 μm |

It goes without saying that the present invention is not limited to these values.

2. Method of Manufacture

The method of manufacture as described below is merely one example of a method of manufacture for the cell 1. The method of manufacture below may be used notwithstanding the shape or configuration of the fuel cell. That is to say, the following method of manufacture may be applied to any structure including a flat shape or cylindrical shape for supporting of the anode, a one-end supporting stack cell, or a double-end supporting stack cell.

The anode 11 may be formed by stacking a ceramic green sheet and applying thermo compression bonding. The ceramic green sheet that configures the anode 11 for example is configured from nickel oxide (NiO), zirconia (8YSZ), and a pore-forming agent (for example PMMA (poly methyl methacrylate resin).

The method of manufacture of the cell 1 includes a step of forming a first intermediate layer 18. This step may be a step, for example, in which the zirconia-based material layer and the ceria-based material layer are co-fired. In this configuration, the first intermediate layer 18 is formed by forming a solid solution by co-firing of the ceria and the zirconia at the contact face between the ceria-based material layer and the zirconia-based material layer. Furthermore, as a result of the firing, the second intermediate layer 19 is formed as a layer that has a higher zirconia concentration (zirconium concentration) than the first intermediate layer 18. However, the method of forming the first intermediate layer 18 is not limited to this method and formation is possible by stacking a material having an adjusted concentration of ceria and zirconia.

The electrolyte layer 13 and the intermediate layer 17 can also be formed by sheet stacking. In other words, a ceramic green sheet formed from a zirconia-based material may be stacked with a ceramic green sheet formed from a ceria-based material, and subjected to compression bonding. A method such as thermo compression bonding or a cold isostatic press (CIP) or the like may be used in compression bonding.

In addition to stacking of a sheet, any one or both of the electrolyte layer 13 and the intermediate layer 17 may be formed by another method such as a slurry dipping method, a brush application method, a stamping method, a printing method, or the like.

After stacking of the material of the electrolyte layer 13 and the intermediate layer 17 on the anode 11, a fired body is obtained by firing and degreasing the green body. In this manner, co-firing (co-sintering) of the zirconia-based material and the ceria-based material is performed.

Next, the cathode 14 is formed. The cathode 14 is formed by firing after application of a cathode material onto the fired body using a printing method or the like. The completion of these steps finishes the cell 1.

EXAMPLES

A Evaluation of Current-Voltage Characteristics of Cell
(1) Method
a. Preparation of Test Sample
a.-1. Formation of Anode An anode is formed by the stacking formation described above. In other words, a ceramic green sheet (thickness 100 μm) configured from nickel oxide (NiO), zirconia (8YSZ), and PMMA as a pore-forming agent is stacked to 300 μm, and subjected to thermo compression bonding (60 degrees C., 3 MPa).

A ceramic green sheet formed from zirconia (8YSZ) that is separately prepared and a ceramic green sheet formed from ceria (GDC) are stacked in sequence onto the green body formed as described above, and subjected to thermo compression bonding.

In this manner, a stacked body in which the anode, zirconia layer, and ceria layer are stacked in sequence is co-fired for two hours at 1300-1500 degrees C.

Thereafter, an LSCF film (30 μm) is applied as a cathode onto the ceria layer and fired for two hours at 1000-1150 degrees C.

b. Evaluation of Cell Sample

The cell sample obtained in the above manner is a stacked body including the anode 11, the second intermediate layer 19, the first intermediate layer 18, the electrolyte layer 13, and the cathode 14, and each layer in the cell sample is stacked in sequence.

Figure 2:
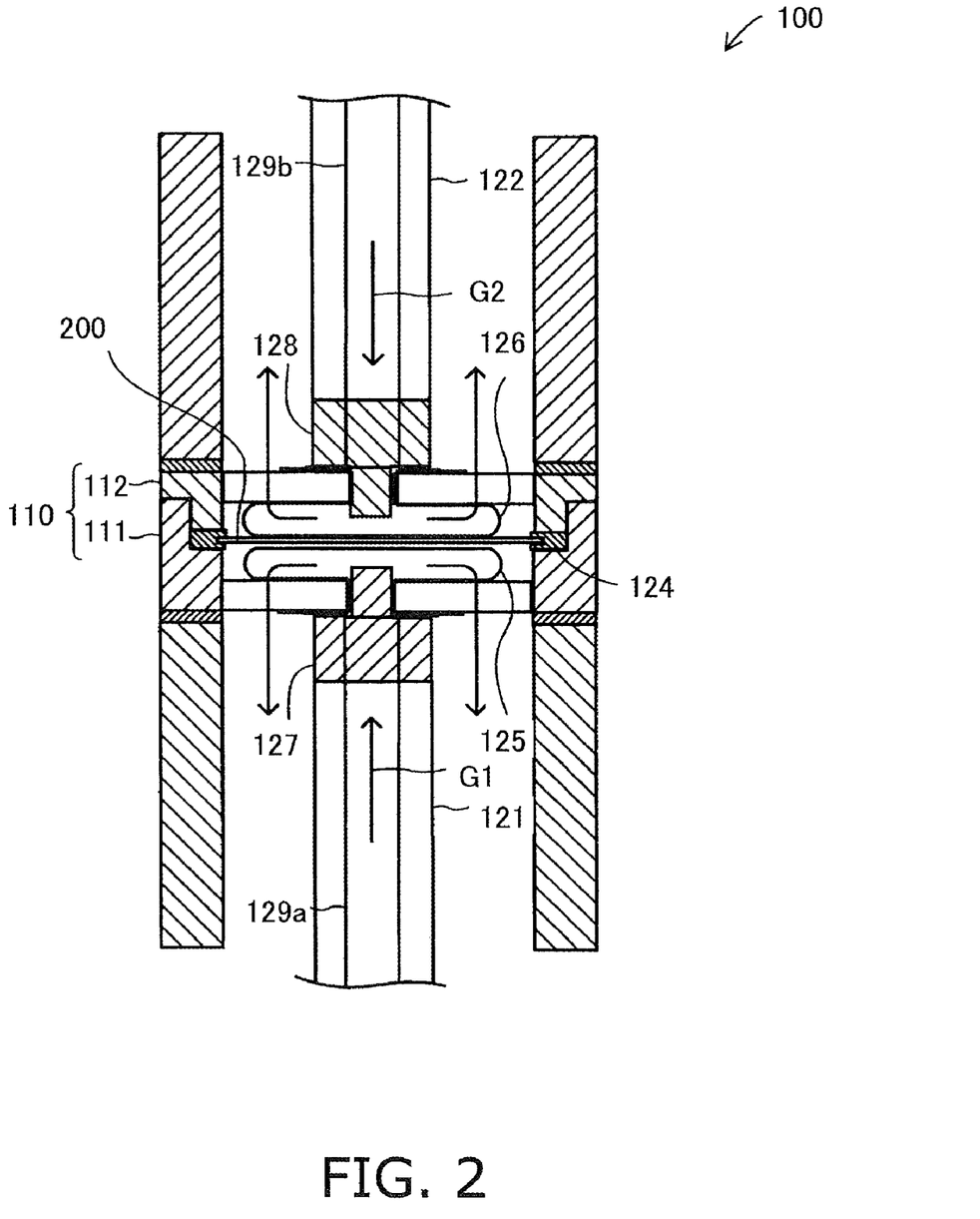
FIG. 2 is a sectional view of general features of a property measurement apparatus for a cell sample.

The cell sample was evaluated in relation to current-voltage characteristics and the like by use of a property measurement apparatus. The evaluation method may be simply described as follows.

b-1. Current Characteristics and Voltage Characteristics i) Property Measurement Apparatus The outline of the property measurement apparatus 100 will be described. The property measurement apparatus 100 measures characteristics in a flat fuel cell sample 200 that has an anode on one surface and a cathode on the other surface.

As illustrated in FIG. 2, the property measurement apparatus 100 includes a fuel gas insertion pipe 121, an oxidizing gas insertion pipe 122, a platinum mesh 125 and 126, a first lead line 129a and a second lead line 129b.

The capsule 110 is divided into a lower portion 111 and an upper portion 112. An outer periphery of the cell sample 200 is retained between the upper portion 112 and lower portion 111 of the capsule to thereby retain the cell sample 200 in an inner portion of the capsule 110.

The fuel gas insertion pipe 121 is connected to the capsule lower portion 111 through a nozzle 127. The oxidizing gas insertion pipe 122 is connected to the capsule upper portion 112 through a nozzle 128.

The platinum meshes 125 and 126 are respectively disposed in the capsule lower portion 111 and upper portion 112 to be connected to the anode and cathode of the cell sample 200 retained in the capsule 110. The platinum meshes 125 and 126 respectively function as a connection collector member.

The first lead line 129a and the second lead line 129b are respectively connected to the respective platinum meshes 125 and 126.

Before performing property measurement, the cell sample 200 is set so that the anode faces downwards between the capsule lower portion 111 and upper portion 112. Furthermore, the interval between the capsule upper portion 112 and the outer periphery of the cell sample 200, and the capsule lower portion 111 and the outer periphery of the cell sample are sealed using a molten glass 124. In this manner, the space between the capsule upper portion 112 and the cell sample 200 is separated from the space between the capsule lower portion 111 and the cell sample 200.

The operation of the property measurement apparatus 100 will be described next. The property measurement apparatus 100 supplies hydrogen gas G1 through the fuel gas insertion pipe 121 between the anode of the cell sample 200 and the capsule lower portion 111 and supplies oxidizing gas G2 through the oxidizing gas insertion pipe 122 between the cathode of the cell sample 200 and the capsule upper portion 112.

Electrons in the anode of the cell sample 200 dissociate from the hydrogen in the supplied hydrogen gas G2 and the hydrogen transforms into hydrogen ions. The electrons that have separated from the hydrogen flow to the cathode of the cell sample 200 through the first lead line 129a and the second lead line 129b. At the cathode, the oxygen in the oxidizing gas G2 accepts the electrons supplied through the first lead line 129a and the second lead line 129b and transforms into oxygen ions. The oxygen ions react with the hydrogen at the anode through the electrolyte layer of the cell sample 200 and become water. The properties of the cell sample such as voltage and current can be measured by connection of a current meter or voltage meter or the like to the first lead line 129a and the second lead line 129b.

ii) Method of Evaluation

Measurements were performed under the following conditions using the property measurement apparatus described above.

Temperature: 700 degrees C.
Fuel Gas: hydrogen 100% (30 degrees humidification)
Oxidizing gas: air A sufficient amount of both fuel gas and oxidizing gas was provided so that the gas usage rate was less than or equal to 5%. The output characteristics are obtained as an I-V curve and the cell resistance value is calculated using impedance analysis.

(2) Results

Table 1 shows the Ohmic resistance, and the output density in a 0.8V rating obtained by varying the thickness of the 8YSZ cell sample that is the intermediate layer and the thickness of the GDC layer that is the electrolyte layer. Table 1 also illustrates the evaluation result for open circuit voltage (OCV). In Table 1, the electrolyte layer is indicated by a GDC layer.

TABLE 1

| Sample | Electrolyte layer | Thickness (μm) | Intermediate Layer | Thickness (μm) | Ohmic Resistance (Ωcm$^2$) | Output Density (W/cm$^2$) | Evaluation Result |
|---|---|---|---|---|---|---|---|
| 1 | GDC | 10 | 8YSZ | 2 | — | — | Reduction in OCV |
| 2 | GDC | 10 | 8YSZ | 2.5 | 0.08 | 1.43 | good |
| 3 | GDC | 10 | 8YSZ | 3 | 0.09 | 1.31 | good |
| 4 | GDC | 10 | 8YSZ | 5 | 0.12 | 1.09 | good |
| 5 | GDC | 10 | 8YSZ | 7 | 0.16 | 0.91 | good |
| 6 | GDC | 10 | 8YSZ | 10 | 0.25 | 0.68 | good |
| 7 | GDC | 10 | 8YSZ | 15 | 0.35 | 0.48 | good |
| 8 | GDC | 5 | 8YSZ | 1.5 | — | — | Reduction in OCV |
| 9 | GDC | 5 | 8YSZ | 2 | — | — | Reduction in OCV |
| 10 | GDC | 5 | 8YSZ | 2.5 | 0.07 | 1.60 | good |
| 11 | GDC | 5 | 8YSZ | 3 | 0.08 | 1.48 | good |
| 12 | GDC | 5 | 8YSZ | 5 | 0.12 | 1.05 | good |
| 13 | GDC | 5 | 8YSZ | 7 | 0.11 | 1.16 | good |
| 14 | GDC | 5 | 8YSZ | 10 | 0.18 | 0.83 | good |
| 15 | GDC | 5 | 8YSZ | 15 | 0.34 | 0.49 | good |
| 16 | GDC | 3 | 8YSZ | 1.5 | — | — | Reduction in OCV |
| 17 | GDC | 3 | 8YSZ | 2 | — | — | Reduction in OCV |
| 18 | GDC | 3 | 8YSZ | 2.5 | 0.07 | 1.73 | good |

TABLE 1-continued

| Sample | Electrolyte layer | Thickness (μm) | Intermediate Layer | Thickness (μm) | Ohmic Resistance (Ωcm²) | Output Density (W/cm²) | Evaluation Result |
|---|---|---|---|---|---|---|---|
| 19 | GDC | 3 | 8YSZ | 3 | 0.07 | 1.65 | good |
| 20 | GDC | 3 | 8YSZ | 5 | 0.12 | 1.13 | good |
| 21 | GDC | 3 | 8YSZ | 7 | 0.13 | 1.04 | good |
| 22 | GDC | 3 | 8YSZ | 10 | 0.20 | 0.79 | good |
| 23 | GDC | 3 | 8YSZ | 15 | 0.34 | 0.50 | good |
| 24 | GDC | 10 | None | — | 0.04 | 0.17 | Reduction in OCV |
| 25 | GDC | 5 | none | — | 0.03 | 0.15 | Reduction in OCV |
| 26 | GDC | 3 | None | — | 0.03 | 0.16 | Reduction in OCV |

As clearly illustrated in Table 1, a reduction (of the level of 0.85 to 0.9V) in OCV is observed in samples No. 24 to 26 that are not provided with the intermediate layer (8YSZ). This is thought to be due to the occurrence of electron leakage due to reduction of ceria in the electrolyte layer (solid electrolyte layer). These samples are not capable of substantially executing high-voltage driving (0.8V rating). As a result, in these samples, the output density at a 0.8V rating is also an extremely low value.

As illustrated in Table 1, a high output density was obtained in samples having a thickness of the intermediate layer of at least 2.5 μm. This is thought to be due to the inhibition of reduction of ceria in the electrolyte layer by functioning of the intermediate layer as an electron barrier layer.

The effect was obtained that a high output density was obtained in samples having a thickness of the intermediate layer of less than or equal to 10 μm. In samples having a thickness of the intermediate layer of greater than or equal to 15 μm, the output density was comparatively low.

Figure 3:
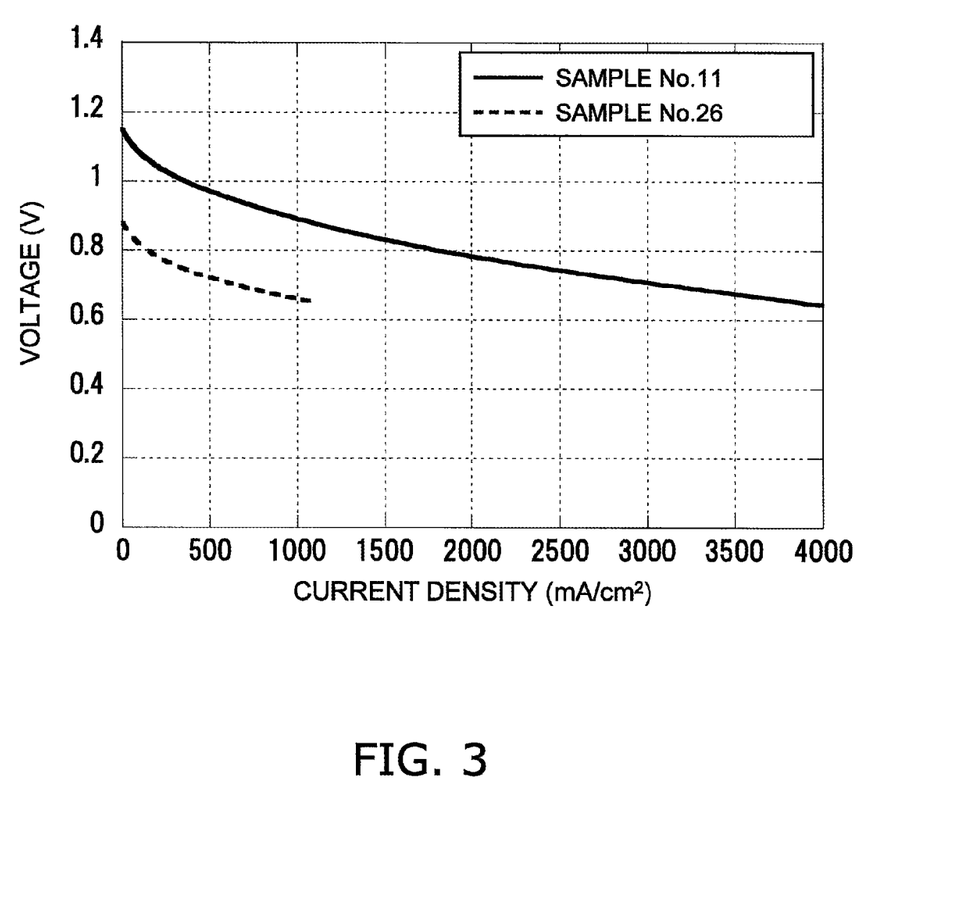
FIG. 3 is a graph showing an example of an I-V curve for a cell sample.

FIG. 3 illustrates an I-V curve for sample No. 11 and sample No. 26 as an example of the current-voltage characteristics of the cell sample. As illustrated in FIG. 3, in comparison to sample No. 2 which is not provided with an intermediate layer, sample No. 11 which is provided with an intermediate layer can perform high voltage driving, and exhibits a high current density at the same voltage.

B. Heat Cycle Testing

SOFC has the advantage of obtaining high power generation efficiency in comparison with other fuel cell stack. On the other hand, since the operation temperature is high, the temperature rapidly increases during use. In view of applications to enable use of a fuel cell stack as a fixed SOFC system, it is preferred for practical use that the temperature increases from room temperature to an operating temperature of 700 degrees C. in approximately one hour.

The reliability of the contact interface in a cell sample of a stacked body of different materials was evaluated by application of heat cycle testing using a cell sample.

(1) Method

A cell sample having a 20 mm diameter was prepared using the same method as A. above. However, a cathode was not formed. This cell sample was subjected to heat cycle testing (100 continuous repetitions) in which the sample was heated to 700 degrees C. in five minutes using a ultraviolet lamp electrical furnace in an atmospheric air and then cooled for 20 minutes by furnace cooling.

After completion of testing, the presence or absence of the production of film peeling in the cell sample was evaluated visually and by use of an electron microscope.

(2) Results

The evaluation results are illustrated in Table 2. In Table 2, a sample denoted by the same sample number as that used as Table 1 has the same layer configuration. That is to say, Table 2 illustrates the results for 18 types of materials except for No. 1, 8, 16 and 17 for which OCV was not obtained of the samples in Table 1.

TABLE 2

| Sample | Electrolyte layer | Thickness (μm) | Intermediate Layer | Thickness (μm) | Evaluation Result |
|---|---|---|---|---|---|
| 2 | GDC | 10 | 8YSZ | 2.5 | good |
| 3 | GDC | 10 | 8YSZ | 3 | good |
| 4 | GDC | 10 | 8YSZ | 5 | good |
| 5 | GDC | 10 | 8YSZ | 7 | good |
| 6 | GDC | 10 | 8YSZ | 10 | good |
| 7 | GDC | 10 | 8YSZ | 15 | Crack in electrolyte layer |
| 10 | GDC | 5 | 8YSZ | 2.5 | good |
| 11 | GDC | 5 | 8YSZ | 3 | good |
| 12 | GDC | 5 | 8YSZ | 5 | good |
| 13 | GDC | 5 | 8YSZ | 7 | good |
| 14 | GDC | 5 | 8YSZ | 10 | good |
| 15 | GDC | 5 | 8YSZ | 15 | Crack in electrolyte layer |
| 18 | GDC | 3 | 8YSZ | 2.5 | good |
| 19 | GDC | 3 | 8YSZ | 3 | good |
| 20 | GDC | 3 | 8YSZ | 5 | good |
| 21 | GDC | 3 | 8YSZ | 7 | good |
| 22 | GDC | 3 | 8YSZ | 10 | good |
| 23 | GDC | 3 | 8YSZ | 15 | Crack in electrolyte layer |

As illustrated in Table 2, a sample having a thickness of the intermediate layer of less than or equal to 10 μm does not exhibit cracking in the electrolyte layer after being subjected to heat cycle testing and retains superior quality as a fuel cell.

On the other hand, a sample having a thickness of the intermediate layer of 15 μm exhibits crack production in the electrolyte layer due to heat cycle testing.

C. Element Mapping

Figure 4:
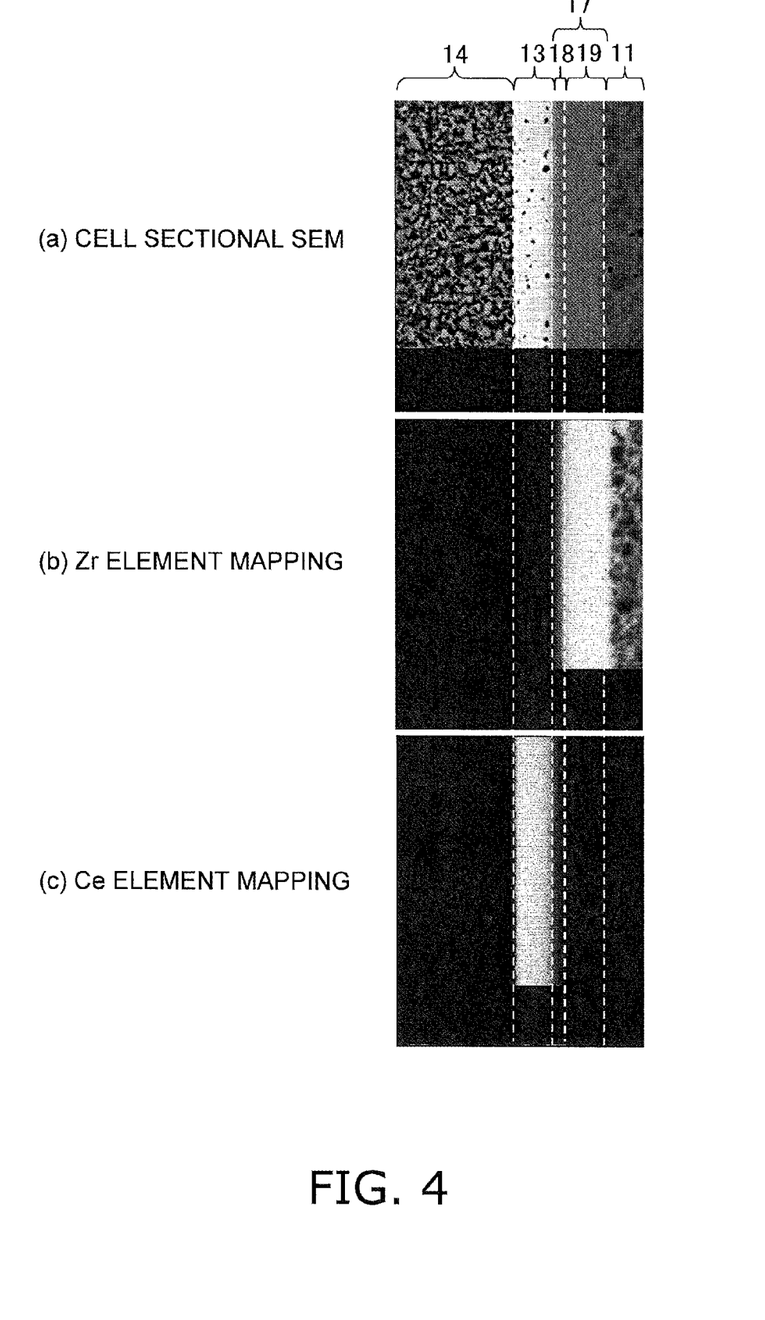

Imaging of a sectional image was performed using an electron microscope and element mapping was performed in relation to Sample No. 13. An element mapping was executed by FE-EPMA (field emission electron probe micro-analyzer). The apparatus used was a field emission analytical electron microscope (JXA-8500F) manufactured by JEOL Ltd. In FIG. 4(b) and FIG. 4(c), the state in which the concentration of atoms is high is shown by white and becomes black as that concentration decreases. As illustrated in FIG. 4(b) and FIG. 4(c), a first intermediate layer 18 containing cerium and zirconium is formed between the electrolyte layer 13 having a high cerium concentration and a second intermediate layer having a high zirconium concentration.

D. Atomic Concentration Profiling

Atomic concentration profiling (line analysis) using EPMA was performed on the same sample. Atomic concentration profiling is performed by quantifying the signal intensity in FIGS. 4(b) and (c). The results are respectively illustrated in FIGS. 5(b) and (c). For the purposes of convenience, the figures showing the profiling results in FIG. 5(b) and FIG. 5(c) are proportional to the concentration of atoms being the subject of profiling, and therefore these figures are termed hereafter "concentration" for the sake of convenience.

Figure 5:
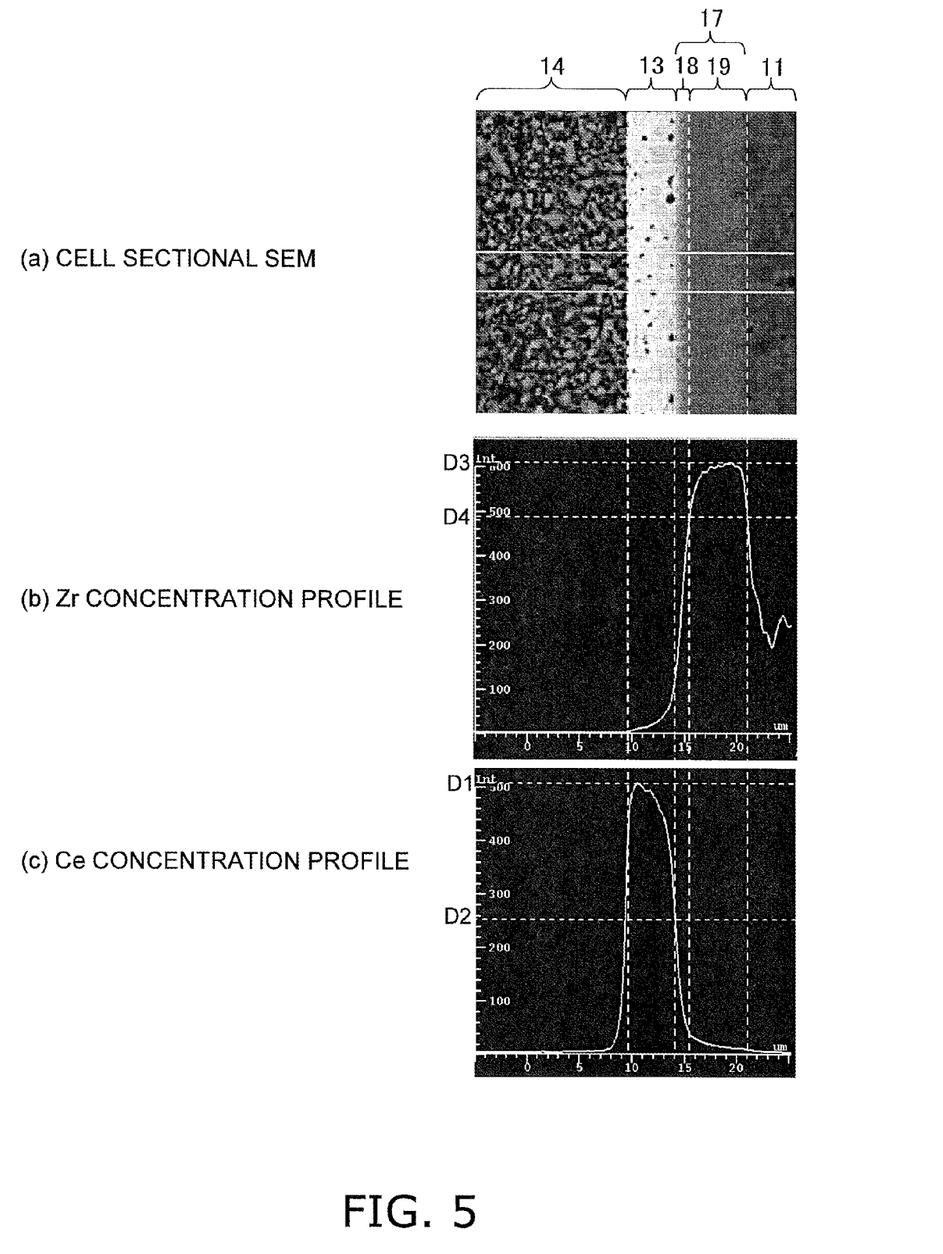

As illustrated in the cerium concentration profile in FIG. 5(c), the interface between the electrolyte layer 13 and the intermediate layer 17, that is to say, the position in the interface between the electrolyte layer 13 and the first intermediate layer 18 is determined as the position that satisfies cerium concentration $D2=D1\times0.5$. The concentration D1 is the maximum value of the cerium concentration in the electrolyte layer 13.

As illustrated in the zirconium concentration profile in FIG. 5(b), the position in the interface between the first intermediate layer 18 and the second intermediate layer 19 is determined as the position that satisfies cerium concentration $D4=D3\times0.8$. The concentration D3 is the maximum value of the zirconium concentration in the intermediate layer 17.

That is to say, as illustrated in FIG. 5(b) and FIG. 5(c), the thickness of the electrolyte layer 13 is 4.3 μm and the thickness of the intermediate layer 17 is 7 μm. Furthermore, the thickness of the first intermediate layer 18 is 1.5 μm the thickness of the second intermediate layer 19 is 5.5 μm.

REFERENCE SIGNS LIST

1 FUEL CELL
11 ANODE
13 ELECTROLYTE LAYER
14 CATHODE
10 FUEL CELL STACK
4 INTERCONNECTOR
41 CONDUCTIVITY CONNECTION PORTION
100 PROPERTY MEASUREMENT APPARATUS
110 CAPSULE
129a FUEL GAS

The invention claimed is:

1. A fuel cell comprising
an anode;
a cathode;
an electrolyte layer containing ceria and provided between the anode and the cathode; and
at least two intermediate layers containing zirconia and provided between the electrolyte layer and the anode, a first intermediate layer containing ceria, and a second intermediate layer being provided between the first intermediate layer and the anode and having a higher zirconia concentration than the first intermediate layer.

2. The fuel cell according to claim 1, wherein
when the maximum value of the cerium concentration in the electrolyte layer takes a value of one, the cerium concentration in an interface between the at least two intermediate layers and the electrolyte layer is 0.5.

3. The fuel cell according to claim 1, wherein
when the maximum value of the zirconium concentration in the intermediate layer takes a value of one, the zirconium concentration in an interface between the first intermediate layer and the second intermediate layer is 0.8.

4. The fuel cell according to claim 1. wherein
the intermediate layer is co-fired with the electrolyte layer.

5. The fuel cell according to claim 1, wherein
the thickness of the intermediate layer is greater than or equal to 2.5 μm.

6. The fuel cell according to claim 1, wherein
the thickness of the intermediate layer is less than or equal to 10 μm.

* * * * *

UNITED STATES PATENT AND TRADEMARK OFFICE
CERTIFICATE OF CORRECTION

PATENT NO.         : 8,349,522 B2                              Page 1 of 1
APPLICATION NO.    : 13/534076
DATED              : January 8, 2013
INVENTOR(S)        : Ayano Kobayashi and Makoto Ohmori It is certified that error appears in the above-identified patent and that said Letters Patent is hereby corrected as shown below:

<u>Column 14, line 29</u>

(claim 4, line 1): Please change "." to -- , --

Signed and Sealed this
Ninth Day of April, 2013

Teresa Stanek Rea
*Acting Director of the United States Patent and Trademark Office*